Figure 1:
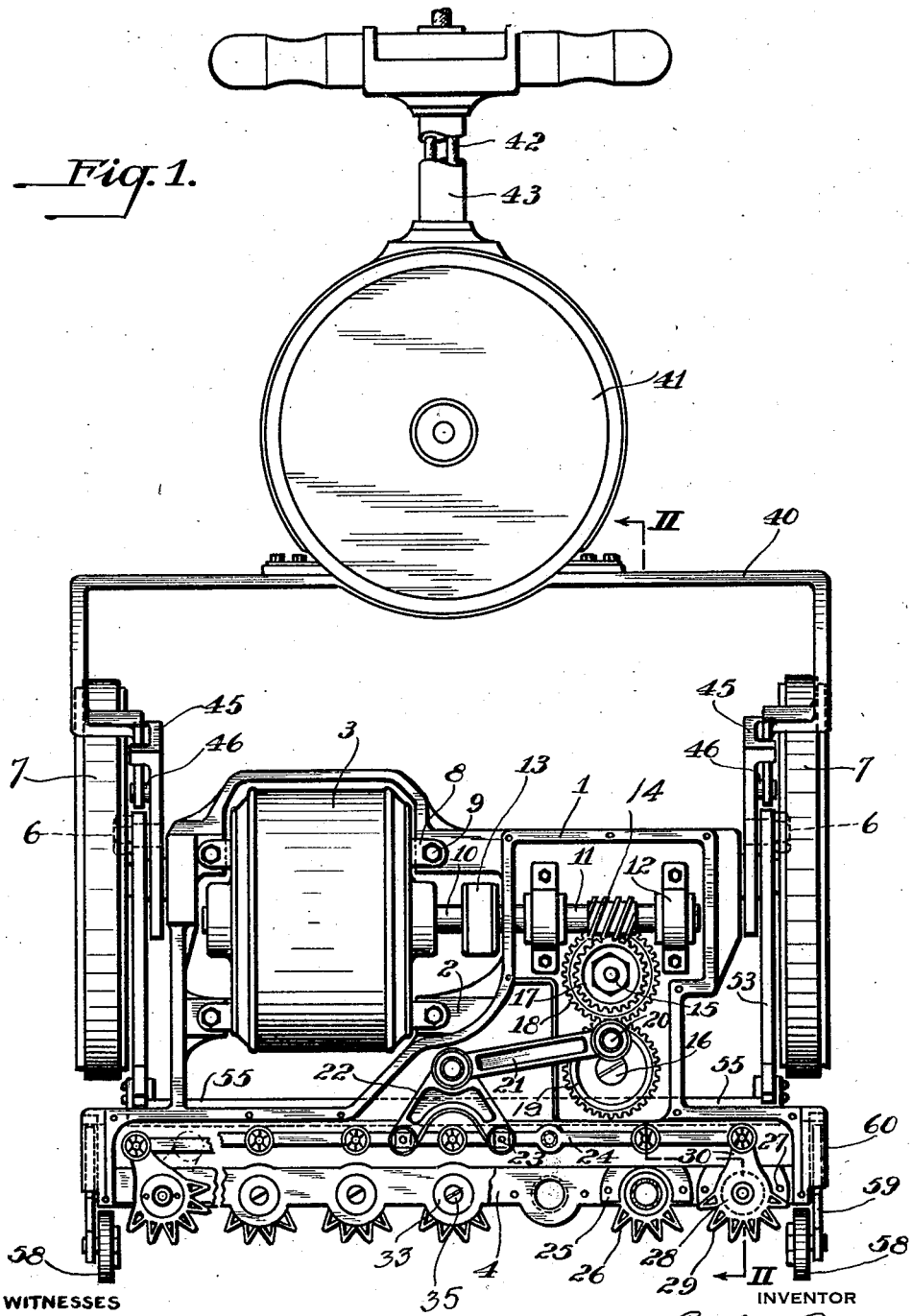

June 4, 1929.   C. K. PERKINS   1,716,085
LAWN MOWER
Filed Nov. 29, 1926   3 Sheets-Sheet 1

WITNESSES
A. B. Wallace.
William B. Jaspert.

INVENTOR
Cecil K. Perkins
by
Winter Brown & Critchlow
his attorneys.

June 4, 1929.  C. K. PERKINS  1,716,085
LAWN MOWER
Filed Nov. 29, 1926  3 Sheets-Sheet 2

WITNESSES
O. B. Wallael
William B. Jaspert

INVENTOR
Cecil K. Perkins
by Winter Brown & Critchlo
his Attorneys.

June 4, 1929.  C. K. PERKINS  1,716,085
LAWN MOWER
Filed Nov. 29, 1926   3 Sheets-Sheet 3
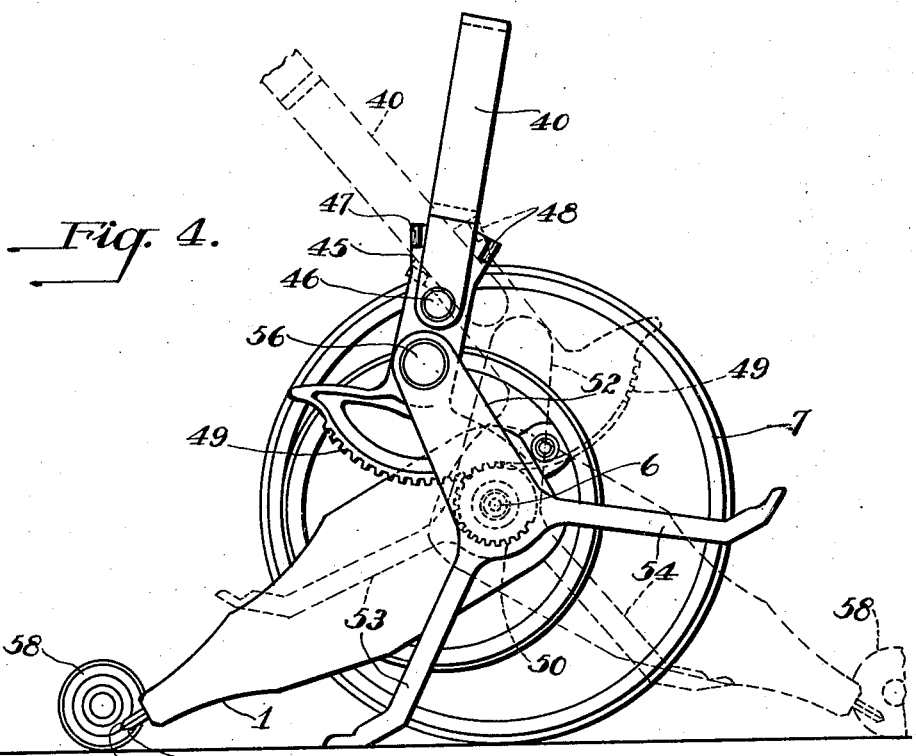
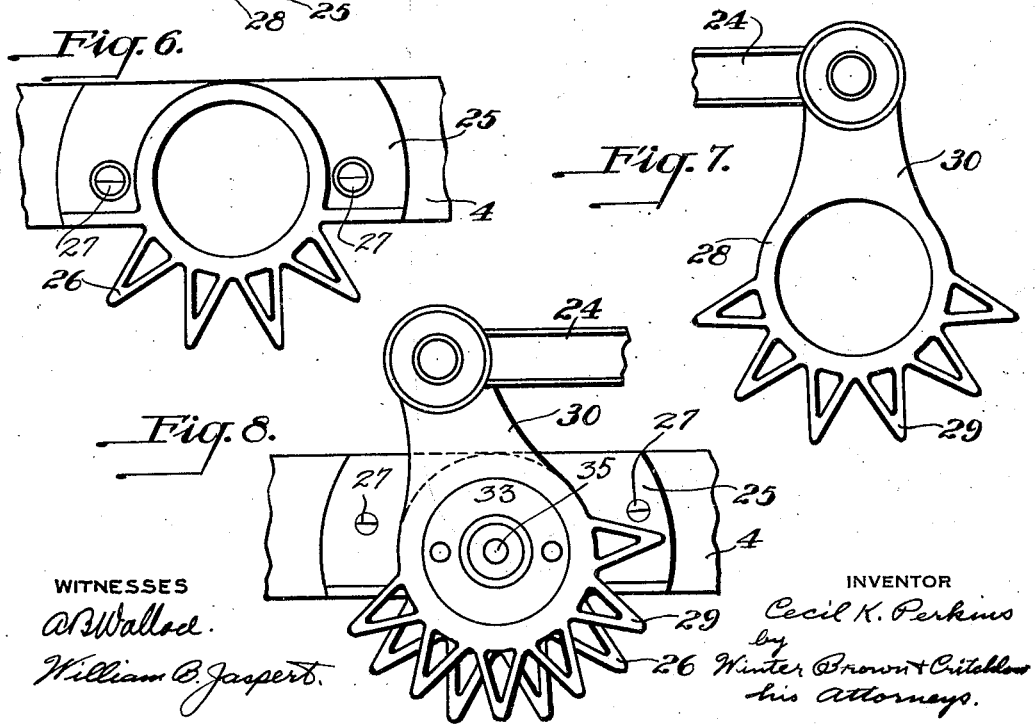
WITNESSES
A B Wallace
William B. Jaspert
INVENTOR
Cecil K. Perkins
by Winter, Brown & Critchlow
his Attorneys.

Patented June 4, 1929.

1,716,085

UNITED STATES PATENT OFFICE.

CECIL K. PERKINS, OF NEW BRIGHTON, PENNSYLVANIA.

LAWN MOWER.

Application filed November 29, 1926. Serial No. 151,328.

This invention relates to mowing machines, more particularly to power mowers in which the cutting mechanism is actuated by a prime mover.

It is among the objects of the invention to provide a power mower of durable and compact mechanical construction which shall comprise a minimum number of parts and which shall be of relatively light weight as compared with other types of power mowing machines heretofore constructed.

Another object of the invention is to provide a power mowing machine in which the operating mechanism and the prime mover are assembled in a common housing, comprising a unitary structure, having cover members, the removal of which makes all of the operating parts accessible for inspection or renewal.

Another object of this invention is to provide a power mower having a novel form of cutter mechanism comprising multiple cutting elements operated by a common actuating device which elements are individually renewable or accessible for repair.

Another object of the invention is to provide a mower of the above designated character which shall be invertible so as to present the cutting mechanism on either side of the supporting wheels, whereby the cutting element is brought to the position in which it is desired to advance the mower for cutting operations, without turning the wheels upon which the mower frame is carried as is necessary in prior types of machines.

Other objects of the invention include a simple adjustable device for regulating the distance of the cutters or cutting edges from the ground and for levelling the machine, means for assembling the cutting elements to render them efficient in their operation, and a supporting bracket for the main frame which functions as a fulcrum support when the machine is inverted, and also constitutes transverse braces, tie rods, or ground rests for the machine frame.

There are two principal types of power mowers in use, one of which embodies the well known reel cutter comprising angularly spaced spiral cutting blades, and the other employing a reciprocating cutter bar cooperating with a stationary bar, and in both of these types it has been common practice to operatively connect the cutting mechanism to the driving mechanism for the purpose of maintaining the speed ratio of the cutting mechanism constant with the speed of travel of the mower over the ground.

In the rotating cutter types the traction wheels are operated to rotate through the drive mechanism and are either geared to the cutting member, or the latter may be directly connected with the drive as well as the traction wheels. Such a mower necessarily involves a complex mechanism and a cumbersome design.

In accordance with the present invention the drive mechanism functions to actuate the cutting elements only, and has no connection of any kind with the supporting or traction wheels, thereby assuring a uniform cutting speed, and permitting the mowing machine to be readily manipulated by the operator in any direction with facility and ease.

Figure 2:
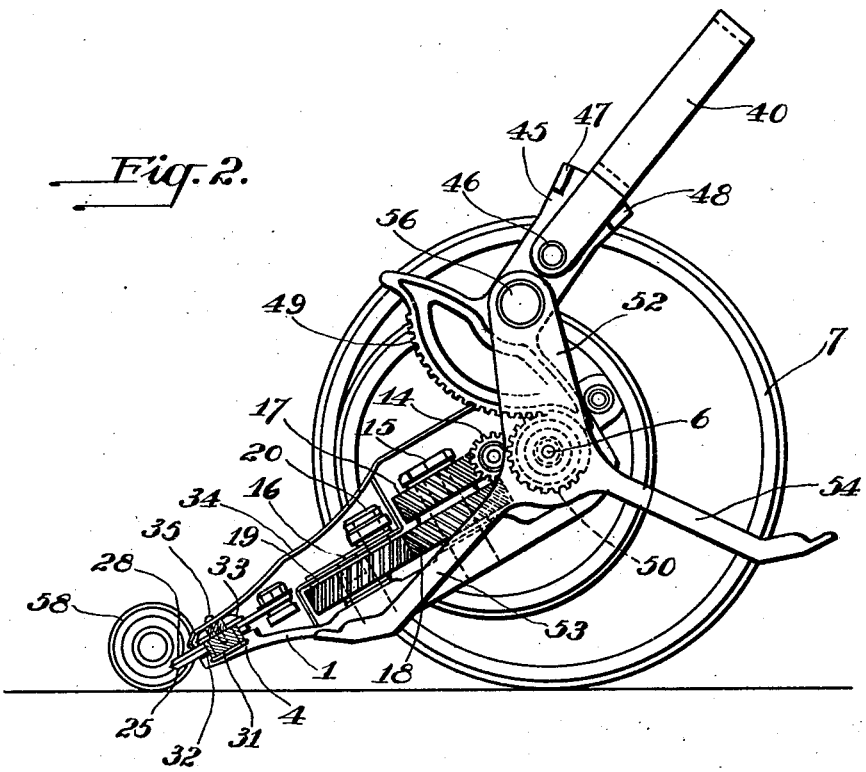
Figure 3:
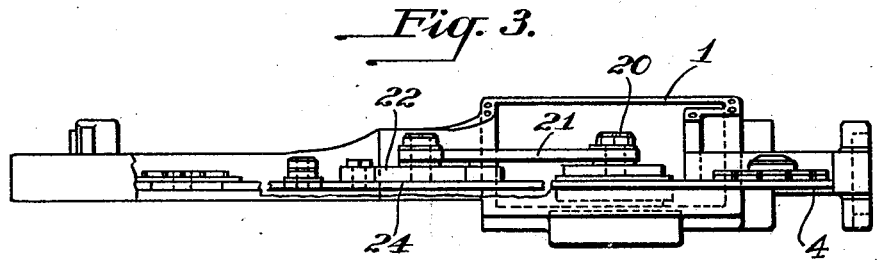
Figure 5:
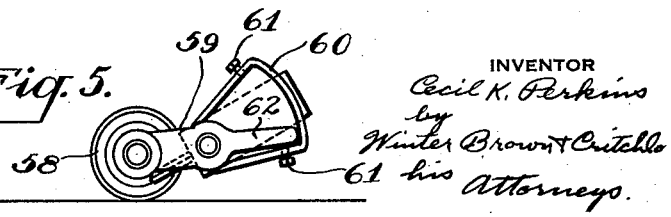

In the accompanying drawings constituting a part hereof and in which like reference characters designate like parts Fig. 1 is a plan view of a power mowing machine, with its top covers removed, embodying the principles of this invention; Fig. 2 an end view thereof; Fig. 3 an elevational view of a portion of the front thereof; Fig. 4 an end elevation illustrating the relative position of the handle, mower frame, and cutters, while the machine is being inverted; Fig. 5 an enlarged detail view of the adjusting mechanism for regulating the relative height of the cutting member with respect to the ground; and Figs. 6, 7, and 8 are plan views of the cooperating cutter members.

Referring to Fig. 1 of the drawing the structure therein illustrated comprises a housing 1 provided with offset or bracket portions 2 for mounting an electric motor 3, and having an extended frame portion 4 for carrying or supporting the cutting elements. The frame 1 is journalled by suitable axles 6 to a pair of wheels 7 which may be of very light construction since they are not provided with gear teeth or other drive connecting means. The motor 3 is mounted on the frame portion 1 by straps or brackets 8 which are adapted to seat on the frame extensions 2 to which they are secured by bolts 9.

The motor shaft 10 is in coaxial alignment with a drive shaft 11 that is mounted in journals 12 of the frame 1. A slip clutch 13 is interposed between the motor shaft 10 and drive shaft 11, and has its clutch elements secured to the respective shafts to permit relative movement thereof. The shaft 11 carries a worm or spiral gear 14 the axis of which is disposed at right angles to a pair of shafts 15 and 16. The gear element 14 is intermeshed with the teeth of a gear wheel 17 which is connected to rotate with the gear wheel 18 both of which are mounted on the shaft 15. The gear wheel 18 engages a gear wheel 19 that is journalled on the shaft 16, and the gear wheel 19 is provided with a crank pin 20 adapted to receive a link 21 that is connected to a triangular shape bracket 22. The bracket is connected by bolts 23 to a reciprocating bar 24, and the latter is actuated by the rotation of the gear wheels 17, 18 and 19. On the frame portion 4 are secured a plurality of stationary cutters 25, Fig. 6, having cutting teeth 26, the teeth being of skeleton form to provide the necessary rigidity and strength without presenting too great a surface area of contact to their cooperating members, for the purpose of cutting down friction to a minimum. The cutter elements 25 are secured to the frame portion 4 by suitable screws 27, as shown. A plurality of movable cutting elements 28, Fig. 7, provided with skeleton teeth 29 corresponding to the teeth 26 of the cutters 25 are superposed on the latter, and pivotally mounted thereon, so that, when the movable cutters are subjected to angular motion, there will be a relative movement of the teeth of the stationary and movable cutters, Fig. 8, which produces the necessary shearing or cutting action. The teeth of the cutters may be chamfered to increase their cutting effect, as seen in Fig. 4.

The movable cutters 28 are provided with a shank portion 30 which is pivotally connected by suitable means to the reciprocating bar 24 so that reciprocatory movement of the bar will impart an angular or oscillatory movement to the cutters 28.

The stationary and movable cutters 25 and 28, respectively, are secured to the frame portion 4 of the mower by screws or bolts 31, Fig. 2, having a bearing bushing 32 disposed therearound, the bushing being of the size of the openings provided in the cutters 25 and 28, and shims or liners, not shown, are disposed over a portion of the surface, and between the members 25 and 28, to properly space the cutting edges of the cutter members. Upon the top cutter members 28 is placed a cup-shaped nut and washer 33 and the cover member 34 of the mower frame 1 is secured directly to the members 31 by screws 35, which lock the elements 31 and 33 with the cover 34.

The frame member 1 housing the drive mechanism and cutting elements is provided with a cross frame or yoke 40 which may be curved at its central portion as shown in Fig. 1 for mounting a reel 41 that carries an electrical conductor cable 42 which extends through the handle 43 at one end, from which it extends to be fastened to a source of electrical energy such as a power line, and the other end of the cable is extended through the frame 40 in a suitable manner and is connected to the motor 3. The cross frame 40 is associated with the mower frame 1 by a movable connection with a segment member 45 to which it is pivotally joined at 46, Fig. 2. The member 45 is provided with a pair of stop lugs 47 and 48 which permit a limited degree of movement of the frame portion 40 without producing any corresponding movement of the member 45 for a purpose as will be hereinafter set forth.

The end of the member 45 is of segment shape and provided with gear teeth 49 which are adapted to engage the teeth 50 of a pinion member that is formed integrally with the stud shaft 6 of the mower frame, the teeth 50 being formed over a portion of the pinion only.

Attached to the member 45 is a supporting bracket 52 having legs 53 and 54 provided with cross members 55, Fig. 1, which constitute cross ties to provide a rigid frame portion adapted to support or carry the entire weight of the mower. The bracket 52 is connected by a pivot bolt 56 to the segment member 45 for the purpose of providing relative movement therebetween which movement is imparted by manipulation of the yoke frame 40 to which the handle portion is attached.

As shown in Fig. 2 the bracket 52 functions as a support for the mower frame and the cutting end of the frame is further supported by guide wheels 58, which are journaled in brackets 59, Fig. 5, that are pivotally connected to the frame portion 4 of the housing 1 to permit relative movement therebetween. The bracket 59 is movable in a frame 60 that is provided with adjustable set screws 61 which function as stops for a finger 62, Fig. 5. The adjustment of the screws 61 determines the relative distance of the cutting edge of the cutters from the ground. This distance may be varied by adjustment of either the top or bottom screw 61 depending upon which side of the cutter bar is adjacent the ground.

One of the features of the invention is the invertibility of the mower, that is, inverting the cutting mechanism through the frame portion 40 of the handle member which is accomplished by the segment member 45 engaging the pinion member 50 and the cooperating supporting bracket 52 in the following manner.

As shown in Fig. 2 the mower is in its normal cutting position for advancement in the direction of the guide roller 58 the frame 40 of the handle portion resting against the stop 48. This position is maintained until at the end of the cut it is desired to reverse the direction of advance of the mower. The operator swings the handle in the direction of the stop 47, and until the frame 40 strikes the stop 47 no change in the position of the cutter mechanism is effected. Upon further advance of the handle the bracket 52 by virtue of its pivotal connection 56 with the segment member 45 pivots around the shaft 6 until its leg 53 engages the ground, as shown in Fig. 4. Further movement of the handle in the same direction will produce a rotation of the pinion member 50 by virtue of its gear tooth engagement with the segment member 49, and the pinion 50 being constituted a fulcrum member by the leg 53 resting upon the ground will cause the entire frame 1 carrying the motor and cutter mechanism to swing about the shaft 6 as a pivot, and passing through the frame portion 40 it will assume a cutting position in the reverse direction with the leg 54 engaging the under side of the machine frame in identically the same way that the leg 53 engages the frame in its position shown in Fig 2. For this reverse cutting position of the mower, the frame 40 of the handle portion will rest upon the stop 47 and the mower is lowered to rest the guide wheels 58 on the ground. The mower may then be advanced in the direction of the cut without at all changing the position of the supporting wheels 7.

This invertible feature of the mower mechanism is a decided advantage in the manipulation of power mowing machines and is only made possible by the symmetrical disposition of the motor and drive mechanism in the machine housing.

In its operation the cutting mechanism is actuated through the drive gears by the drive motor 3 which actuates the drive shaft 11 which in turn rotates the gear elements and by virtue of the crank connection of the link 21 and bracket 22 with the driven gear 19 and the reciprocating bar 24 the movable cutter elements 28 are oscillated about their pivot bolts 31 at a uniform cutting speed. Since there are no operative connections whatever between the drive mechanism for the cutters, and the supporting wheels, the machine may be advanced in the direction of the cut at any desired speed but the advance is more or less dependent upon the cutting resistance met with or the denseness of growth through which the cutter mechanism advances so that the cutting speed may somewhat vary when the operator exerts a steady push or pressure on the handle bars. One of the desirable features of isolating the cutting mechanism from the wheel members is the ease with which the mower may be handled in adapting it to irregular cutting paths for working around shrubbery, walls and the like.

The invertible feature of the cutter is likewise a marked improvement in power mowers as it eliminates the heretofore exertion necessary in moving the machine around by pivoting it on one wheel and withdrawing the machine from the end of its cut for the purpose of turning the same.

It is evident from the foregoing description of the invention that power mowers constructed in accordance therewith, are of light weight and durable construction, embodying a minimum of wearing parts, and the machines are susceptible of use for close cutting, without requiring any great amount of exertion by the operator.

Although a specific embodiment of the invention has been herein set forth and described it will be obvious to those skilled in the art that various modifications may be made in the details of construction without departing from the principles thereof.

I claim:

1. In a mowing machine, the combination with a machine frame journalled in a pair of supporting wheel members, of a substantially yoke-shape handle supporting member movably connected to said frame, a cutting mechanism mounted in said machine frame, and means for inverting said machine frame to reverse the position of the cutting mechanism while maintaining the wheels in fixed position.

2. In a mowing machine, the combination of a machine frame journalled in a pair of supporting wheel members, cutting mechanism mounted in said frame, a substantially yoke-shape handle-supporting member, a rack and pinion connection between the arms of said member and each side of the frame, and a ground support bracket on each side of the frame pivotally connected to said rack, movement of the handle-supporting member on a horizontal axis pivoting the frame on said brackets as a fulcrum to invert the frame and cutting mechanism to cut in a reverse direction.

3. In a mowing machine the combination with a machine frame journalled in a pair of supporting wheel members and cutting mechanism carried by said frame, of a pair of segment shaped racks in gear-tooth engagement with said frame, a yoke-shape handle support pivotally connected to said brackets, and a ground support pivotally connected to said bracket, said ground support constituting a fulcrum for turning the machine frame to invert the same.

4. In a mowing machine the combination with a machine frame journalled in a pair of supporting wheel members, a cutting mechanism mounted on said frame, of a pair of segment shaped brackets in gear-tooth engagement with said frame, a yoke-shape handle support pivotally connected to said brackets, and a ground support pivotally connected to each of said brackets, said handle support being movable to impart angular movement to said segment brackets to rotate the machine frame, by virtue of their gear-tooth engagement therewith, on its supporting wheels, thereby reversing the cutting mechanism.

5. In a mowing machine, the combination with a cutter frame, of a cutting mechanism mounted on said frame, an inverting mechanism for reversing the position of the cutting mechanism to cut in the opposite direction, and means for adjusting the depth of cut for either position of the cutters.

6. In a mowing machine, the combination with a cutting mechanism comprising a frame, stationary and oscillating cutter members mounted thereon for cooperative cutting action, and motor-operated mechanism for actuating said oscillating cutters; of means for inverting the position of the cutting mechanism in the machine to cut in the reverse direction.

7. In a mowing machine, the combination with a cutting mechanism comprising a frame, a plurality of toothed stationary cutters, a plurality of movable toothed cutters mounted on the stationary cutters for cooperative cutting action, and motor-operated mechanism for oscillating said movable cutters relative to said stationary cutters; of means for inverting the position of said cutting mechanism in the machine to cut in the reverse direction.

8. In a mowing machine, the combination of a frame, a handle connected to said frame, cutting mechanism pivotally supported in said frame comprising a plurality of fixed segmental cutters, a plurality of movable segmental cutters, and motor-operated mechanism for oscillating said movable cutters relative to said fixed cutters, and means associated with said frame and cutting mechanism for inverting the cutting position of said cutting mechanism when the frame is pivotally turned on a horizontal axis.

9. A mowing machine comprising a pair of supporting wheels, a frame journalled in said wheels, a plurality of segmentally serrated fixed cutters disposed on said frame, a plurality of segmentally dentate movable cutters pivotally mounted to cooperate with said fixed cutters, motor-operated mechanism for oscillating said movable cutters, segmental racks meshing with pinions on said frame, a handle pivotally connected to said racks, and yoke-shaped ground supports pivotally connected to said racks, said handle being adapted to actuate said racks to bring one side of said ground supports against the ground to act as a fulcrum to raise and reverse the cutting position of the frame and cutting mechanism upon further movement of said handle.

10. A mowing machine comprising a frame, supporting wheels, fixed and oscillating toothed cutters, motor-actuated mechanism for operating said cutters, means for reversing the cutters to cut in the opposite direction, guide wheels, brackets pivotally connecting said guide wheels to said frame, and means for adjusting the angular disposition of said brackets to raise or lower said frame for varying the depth of cut.

In testimony whereof, I sign my name.

CECIL K. PERKINS.